(12) United States Patent
Zhang et al.

(10) Patent No.: US 12,395,096 B2
(45) Date of Patent: Aug. 19, 2025

(54) MICRO INVERTER HAVING MULTIPLE INDEPENDENT INPUTS, AND PHOTOVOLTAIC SYSTEM

(71) Applicant: Sungrow Power Supply Co., Ltd., Hefei (CN)

(72) Inventors: Lu Zhang, Hefei (CN); Yu Gu, Hefei (CN); Linhai Zhao, Hefei (CN); Qiaodi Chen, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 45 days.

(21) Appl. No.: 18/484,261

(22) Filed: Oct. 10, 2023

(65) Prior Publication Data

US 2024/0128890 A1    Apr. 18, 2024

(30) Foreign Application Priority Data

Oct. 12, 2022    (CN) .......................... 202222683536.0

(51) Int. Cl.
*H02M 1/00* (2007.01)
*H02M 3/335* (2006.01)
(Continued)

(52) U.S. Cl.
CPC ....... *H02M 7/5387* (2013.01); *H02M 1/0083* (2021.05); *H02M 3/33573* (2021.05); *H02M 3/33584* (2013.01); *H02M 7/797* (2013.01)

(58) Field of Classification Search
CPC ............ H02M 7/5387; H02M 1/0083; H02M 3/33573; H02M 3/33584; H02M 7/797;
(Continued)

(56) References Cited

U.S. PATENT DOCUMENTS 9,685,886 B2 *  6/2017  Modeer ................. H02S 40/32
2002/0024824 A1   2/2002  Reinold
(Continued)

FOREIGN PATENT DOCUMENTS

| CN | 1684349 | * 10/2005 |
| CN | 1684349 A | 10/2005 |
| CN | 112054691 B | 7/2021 |

OTHER PUBLICATIONS

Extended European Search Report for European Application No. 23202969.4 dated Mar. 4, 2024.
(Continued)

*Primary Examiner* — Rexford N Barnie
*Assistant Examiner* — Xuan Ly
(74) *Attorney, Agent, or Firm* — Wolf, Greenfield & Sacks, P.C.

(57) ABSTRACT

A micro inverter having a plurality of independent inputs and a photovoltaic system are provided. The micro inverter includes multiple isolated DC-DC converters and a DC-AC converter. Each isolated DC-DC converter of the isolated DC-DC converters includes an inverter H-bridge, a transformer and a voltage-multiplying rectifier. An input terminal of the inverter H-bridges is configured to connect to a direct-current power supply. A secondary winding of the transformer is connected to an input terminal of the voltage-multiplying rectifier. An output terminal of the voltage-multiplying rectifier is connected to an input terminal of the DC-AC converter. A leakage inductor or an external inductor of the transformer forms series resonance along with a capacitor in the voltage-multiplying rectifier.

16 Claims, 5 Drawing Sheets

(51) Int. Cl.
*H02M 7/5387* (2007.01)
*H02M 7/797* (2006.01)

(58) Field of Classification Search
CPC ...... H02M 1/007; H02M 1/0077; H02M 3/01; H02M 3/33592; H02M 7/53871; H02M 1/00; H02M 3/335; Y02E 10/56
USPC .......................................................... 307/104
See application file for complete search history.

(56) References Cited

U.S. PATENT DOCUMENTS

2014/0211529 A1* 7/2014 Kandasamy .......... H02M 7/797
363/131
2019/0341855 A1* 11/2019 Kim ...................... H02M 7/219

OTHER PUBLICATIONS

Vinnikov et al., High-Performance Quasi-Z-Source Series Resonant DC-DC Converter for Photovoltaic Module-Level Power Electronics Applications. IEEE Transactions on Power Electronics. May 1, 2017;32(5):3634-50.

* cited by examiner

MICRO INVERTER HAVING MULTIPLE INDEPENDENT INPUTS, AND PHOTOVOLTAIC SYSTEM

This application claims priority to Chinese application No. 202222683536.0, titled "MICRO INVERTER HAVING MULTIPLE INDEPENDENT INPUTS, AND PHOTOVOLTAIC SYSTEM", filed on Oct. 12, 2022 with the China National Intellectual Property Administration, which is incorporated herein by reference in its entirety.

FIELD

The present disclosure relates to the field of new energy technology, and in particular to a micro inverter having multiple independent inputs and a photovoltaic system.

BACKGROUND

A photovoltaic inverter, or a micro inverter, has no cask effect due to series-connected photovoltaic components, and can be operated and maintained at a component level, so as to realize maximum power point tracking (MPPT) at a photovoltaic component level. Therefore, the micro inverter attracts lots of attention.

Conventionally, the micro inverter includes an isolated DC-DC converter and a DC-AC converter. The isolated DC-DC converter includes an inverter H-bridge, a transformer and a rectifier.

A turn ratio of the transformer in the isolated DC-DC converter is large, which results in a large volume of the transformer.

SUMMARY

In view of this, a micro inverter having multiple independent inputs and a photovoltaic system are provided according to the present disclosure, in order to reduce a turn ratio of a transformer, and thereby reduce a volume of the transformer.

A micro inverter having multiple independent inputs is provided according to an embodiment of the present disclosure. The micro inverter includes multiple isolated DC-DC converters and a DC-AC converter. Each isolated DC-DC converter of the isolated DC-DC converters includes an inverter H-bridge, a transformer, and a voltage-multiplying rectifier. An input terminal of the inverter H-bridge is configured to connect to a direct-current power supply. A secondary winding of the transformer is connected to an input terminal of the voltage-multiplying rectifier. An output terminal of the voltage-multiplying rectifier is connected to an input terminal of the DC-AC converter. A leakage inductor or an external inductor of the transformer forms series resonance along with a capacitor in the voltage-multiplying rectifier.

Preferably, transformers in the DC-DC converters have isolated primary windings and isolated secondary windings. The secondary windings of the transformers are connected in parallel with each other, and the parallel secondary windings are connected to the input terminal of the voltage-multiplying rectifier. An equivalent leakage inductor of the parallel secondary windings forms the series resonance along with the capacitor in the voltage-multiplying rectifier.

Preferably, transformers in the DC-DC converters have isolated primary windings. Secondary windings of the transformers in the DC-DC converters are connected in series. The external inductor is connected in series between the series-connected secondary windings of the transformers and the input terminal of the voltage-multiplying rectifier. The external inductor forms the series resonance along with the capacitor in the voltage-multiplying rectifier.

Preferably, transformers of the isolated DC-DC converters share a same primary winding and a same secondary winding.

Preferably, the voltage-multiplying rectifier includes a switch arm and a capacitor arm, where the switch arm and the capacitor arm are connected in parallel. Two terminals of the secondary winding of the transformer are connected to an intermediate terminal in the switch arm and an intermediate terminal in the capacitor arm, respectively. The leakage inductor forms the series resonance along with the capacitor which is in the capacitor arm.

Preferably, two output terminals of the inverter H-bridge are connected to two terminals of a primary winding of the transformer, respectively.

Preferably, the inverter H-bridge is a full-bridge inverter, and the DC-AC converter is a full-bridge DC-AC converter.

Preferably, the micro inverter further includes: a bus capacitor, connected in parallel to the input terminal of the DC-AC converter; and a filter circuit, connected to an output terminal of the DC-AC converter. The micro inverter is a bi-directional inverter.

Preferably, the direct-current power supply is a photovoltaic component, a power battery, or a fuel cell.

A photovoltaic system is further provided according to an embodiment of the present disclosure. The photovoltaic system includes a photovoltaic module and the micro inverter as described above, where the micro inverter is connected to an output of the photovoltaic component.

Beneficial effects of the present disclosure are described below.

The micro inverter according to the present disclosure includes the isolated DC-DC converter and the DC-AC converter. The isolated DC-DC converter includes the inverter H-bridge, the transformer, and the voltage-multiplying rectifier. The leakage inductor of the transformer forms the series resonance along with the capacitor in the voltage-multiplying rectifier. Adjustment on a resonance frequency can realize adjustment of impedance of the circuit. The impedance of the circuit is connected in series to a load, so that a current in the load changes with a change of the impedance, which results in adjustment of a voltage gain of the circuit. Thereby, a voltage of the circuit can be adjusted, and a turn ratio of the transformer can be reduced, which is conductive to reducing a volume of the transformer.

DETAILED DESCRIPTION OF EMBODIMENTS

In order to enable those skilled in the art to better understand the micro inverter according to the embodiments of the present disclosure, an application scenario of the micro inverter is described below in conjunction with the drawings. The present disclosure is described by taking an example in which the micro inverter is applied to a household photovoltaic system.

Figure 1:
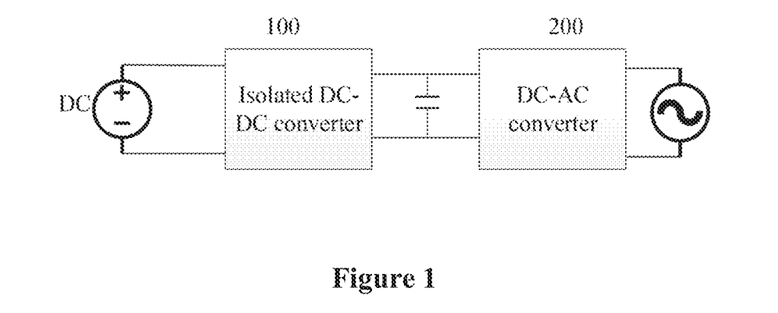
FIG. 1 is a schematic diagram of a micro inverter according to an embodiment of the present disclosure.

Reference is made to FIG. 1, which is a schematic diagram of a micro inverter according to an embodiment of the present disclosure.

The micro inverter is an isolated inverter, and includes an isolated DC-DC converter 100 and a DC-AC converter 200. The isolated DC-DC converter 100 includes an inverter H-bridge, a transformer and a rectifier. The rectifier may be implemented as a voltage-multiplying rectifier. The transformer is configured to realize electrical isolation between a primary side and a secondary side.

An input terminal of the inverter H-bridge is connected to a direct-current power supply. The direct-current power supply may be a photovoltaic string. Alternatively, the direct-current power supply may be a power battery or a fuel cell. In the present disclosure, description is made by taking an example in which the direct-current power supply is a photovoltaic string.

The micro inverter is of a two-stage structure. The isolated flyback DC-DC converter at a pre-state is for realizing maximum power point tracking and rising a bus voltage. The DC-AC converter at a post-stage is for grid-connection. The isolated DC-DC converter and the DC-AC converter are connected with each other through a bus capacitor.

The number of direct-current power supplies corresponding to the micro inverter may be one or more, which is not limited herein. The micro inverter show in FIG. 1 is connected with one direct-current power supply. An implementation in which a micro inverter is connected with multiple direct current power supplies is described below in conjunction with FIG. 2.

Figure 2:
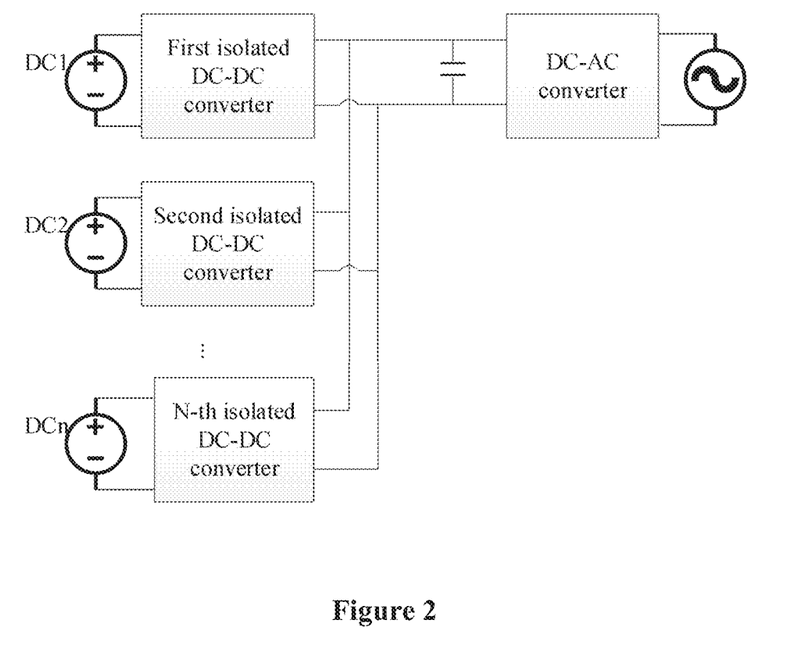
FIG. 2 is a schematic diagram of a micro inverter according to another embodiment of the present disclosure.

Reference is made to FIG. 2, which is a schematic diagram of a micro inverter according to another embodiment of the present disclosure.

The micro inverter according to this embodiment includes multiple isolated DC-DC converters and a DC-AC converter. The isolated DC-DC converters correspond to direct-current power supplies in a one-to-one correspondence. For example, an input terminal of a first isolated DC-DC converter is connected to a first direct-current power supply DC1, an input terminal of a second isolated DC-DC converter is connected to a second direct-current power supply DC2, and the like. That is, an input terminal of an n-th isolated DC-DC converter is connected to an n-th direct-current power supply DCn.

The isolated DC-DC converters correspond to a same DC-AC converter.

In a structure in which the micro inverter is connected to multiple direct current power supplies, isolated DC-DC converters at a pre-state are for realizing MPPT and voltage rising for each photovoltaic component. The isolated DC-DC converters are connected to a same DC-AC converter, for outputting energy to the grid. The micro inverter of a two-stage flyback structure has few devices and a simple topology. However, such micro inverter has the following disadvantages. The transformer has a large transformation ratio, which results in a large volume of the micro inverter. Resonance due to the leakage inductor of the transformer and a parasitic capacitor of a switch transistor results in loss and an EMI problem. A rectifier diode has an inherent switching loss. A high current ripple on the capacitor results in a reduced stability of the system. There is a low efficiency and a high device stress in a DCM mode and a CCM mode.

In order to make the above objectives, features and advantages of the present disclosure more obvious and easier to be understood, the embodiments of the present disclosure are described in detail below in conjunction with the drawings and the embodiments.

In the present disclosure, in order to reduce a turn ratio and volume of the transformer, the leakage inductor of the transformer and the capacitor in the voltage-multiplying rectifier are configured to form the series resonance. In this way, adjustment on a resonance frequency can realize adjustment of impedance of the circuit, and thereby a current in the load is adjusted. Therefore, a gain of the micro inverter can be adjusted, and the turn ratio of the transformer can be reduced. A voltage is adjusted by adjusting the gain, rather than only through the transformer. As the turn ratio of the transformer is reduced, the volume of the transformer is reduced, and power consumption is reduced.

According to embodiments of the present disclosure, the number of primary windings of the transformer in the micro inverter may be one or more, and the number of secondary windings of the transformer in the micro inverter may be one or more. In a case that the transformer includes multiple primary windings, the primary windings are independent from each other. In a case that the transformer includes multiple secondary windings, the secondary windings may be connected in parallel or in series with each other. Different implementations are described below in conjunction with the drawings.

Figure 3:
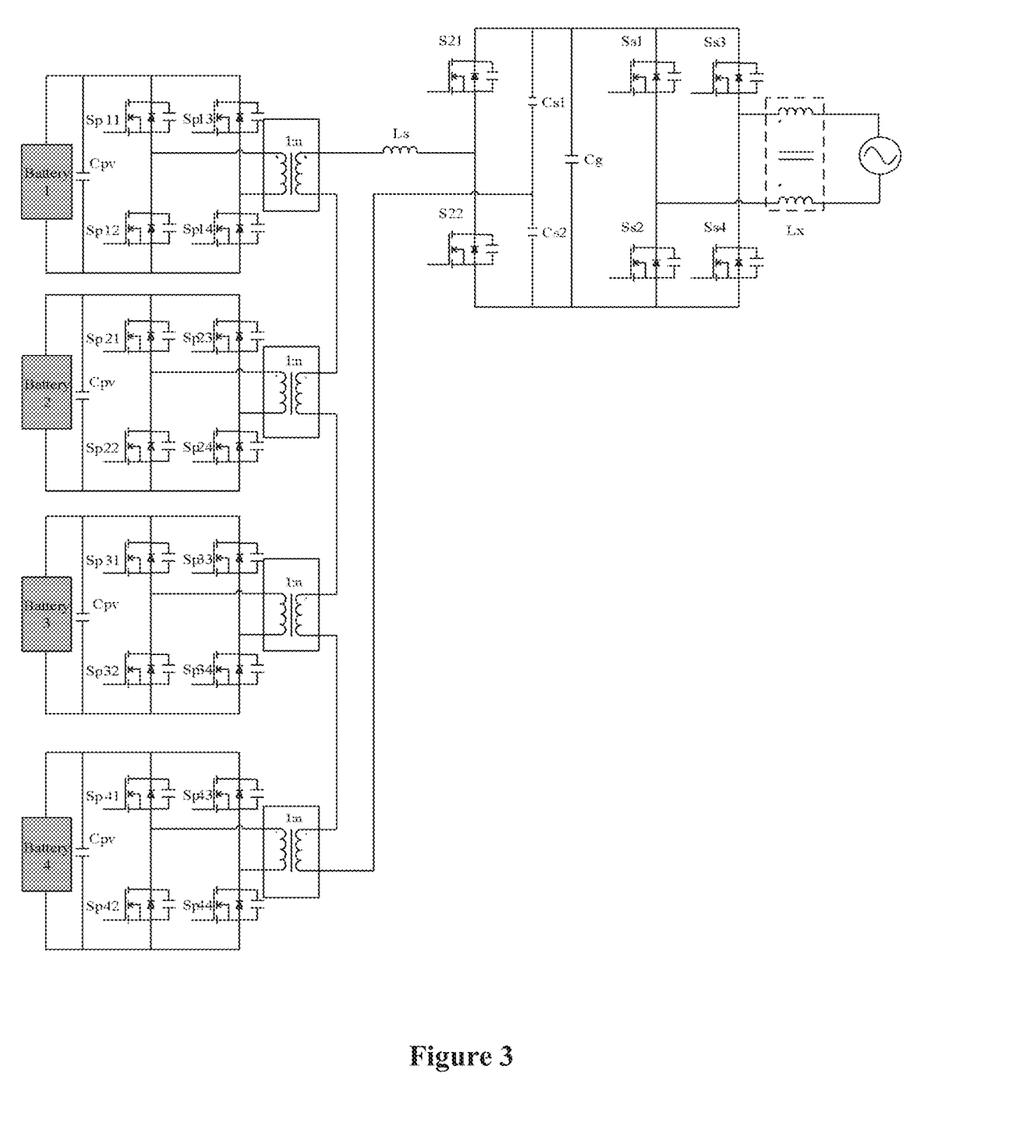
FIG. 3 is a schematic diagram of a micro inverter according to another embodiment of the present disclosure.

Reference is made to FIG. 3, which is a schematic diagram of a micro inverter according to another embodiment of the present disclosure.

According to an embodiment of the present disclosure, the micro inverter having multiple independent inputs includes multiple isolated DC-DC converters and a DC-AC converter. Each isolated DC-DC converter of the isolated DC-DC converters includes an inverter H-bridge, a transformer and a voltage-multiplying rectifier.

An input terminal of the inverter H-bridge is configured to connect to a direct-current power supply. This embodiment is described by taking an example in which the micro inverter includes four isolated DC-DC converters, and the four isolated DC-DC converters are connected to four direct-current power supplies, where the direct-current power supplies are batteries, namely, battery 1, battery 2, battery 3 and battery 4. The direct-current power supply may be a photovoltaic panel, i.e. a photovoltaic component.

The input terminal of the inverter H-bridge is further connected to an input capacitor Cpv. A first inverter H-bridge includes four switch transistors, i.e., Sp11, Sp12, Sp13 and Sp14. A second inverter H-bridge includes four switch transistors. i.e., Sp21, Sp22, Sp23 and Sp24. A third inverter H-bridge includes four switch transistors, i.e., Sp31, Sp32, Sp33 and Sp34. A fourth inverter H-bridge includes four switch transistors, i.e., Sp41, Sp42, Sp43 and Sp44.

A turn ratio of each of four transformers is 1:n.

A secondary winding of the transformer is connected to an input terminal of the voltage-multiplying rectifier, and an output terminal of the voltage-multiplying rectifier is connected to an input terminal of the DC-AC converter. The DC-AC converter includes four switch transistors, i.e., Ss1, Ss2, Ss3 and Ss4.

The voltage-multiplying rectifier includes a switch arm and a capacitor arm, which are connected in parallel. The switch bridge arm includes two switch transistors S21 and S22 that are connected in series. The capacitor arm includes two capacitors Cs1 and Cs2 that are connected in series.

Secondary windings of the transformers are connected in series. The series-connected secondary windings are connected in series to an external inductor Ls. Two terminals of the series-connected secondary windings and the external inductor Ls are connected to an intermediate terminal in the switch arm and an intermediate terminal in the capacitor arm, respectively.

The external inductor Ls forms series resonance along with the capacitor which is in the capacitor arm. That is, the series resonance is formed from Ls, Cs1 and Cs2. As shown in FIG. 3, the external inductor Ls is connected in series to the secondary windings of the transformers. In addition, the input terminal of the DC-AC converter is further connected to a bus capacitor Cg. That is, the bus capacitor Cg is connected in parallel with the input terminal of the DC-AC converter.

Magnetic channels of the transformers as in FIG. 3 are independent from each other. The inductor Ls resonates with the capacitor in the capacitor arm. It should be understood that the Ls does not operates as a leakage inductor of the transformer. The secondary windings of the transformers are connected in series and each single transformer does not have a leakage inductor. Therefore, Ls is physically an external inductor independent from the transformers.

The micro inverter according to the embodiment of the present disclosure further includes a filter circuit connected to the output terminal of the DC-AC converter. A specific implementation of the filter circuit is not limited in the embodiments of the present disclosure. The filter circuit may include any one of an inductor or a capacitor. The filter circuit is represented by Lx in the drawings.

The switch transistor in the inverter H-bridge is a high-frequency switch for converting a direct-current voltage into a voltage having a bipolar square wave. The inverter H-bridge is connected to a primary winding of a transformer.

According to an embodiment of the present disclosure, the micro inverter may be a bi-directional inverter, capable of transmitting energy from the direct-current power supply to the grid and transmitting energy from the grid to the direct-current power supply. For example, in a case that the direct-current power supply is a battery, the battery may be charged with the energy from the grid.

In the micro inverter as shown in FIG. 3, transformers in the DC-DC converters have isolated primary wingdings. Secondary windings of the transformers are connected in series. The external inductor Ls is connected in series between the series-connected secondary windings of the transformers and the input terminal of the voltage-multiplying rectifier. That is, a first terminal of the external inductor Ls is connected to a first terminal of the series-connected secondary windings. A second terminal of the external inductor Ls is connected to a common terminal of the switch transistor S21 and the switch transistor S22. A second terminal of the series-connected secondary windings is connected to a common terminal of the capacitor Cs1 and the capacitor Cs2.

The external inductor forms the series resonance along with the capacitor in the voltage-multiplying rectifier.

In the micro inverter according to the embodiment of the present disclosure, the external inductor of the transformer forms the series resonance along with the capacitor in the voltage-multiplying rectifier. In this way, adjustment on a resonance frequency can realize adjustment of impedance of the circuit. The impedance of the circuit is connected in series to a load, so that a current in the load changes with a change of the impedance, which results in adjustment of a voltage gain of the circuit. Thereby, a voltage of the circuit can be adjusted, and a turn ratio of the transformer is reduced, which is conductive to reducing a volume of the transformer.

The secondary windings of transformers shown in FIG. 3 are connected in series. An implementation in which secondary windings of transformers are connected in parallel is described below in conjunction with FIG. 4.

Figure 4:
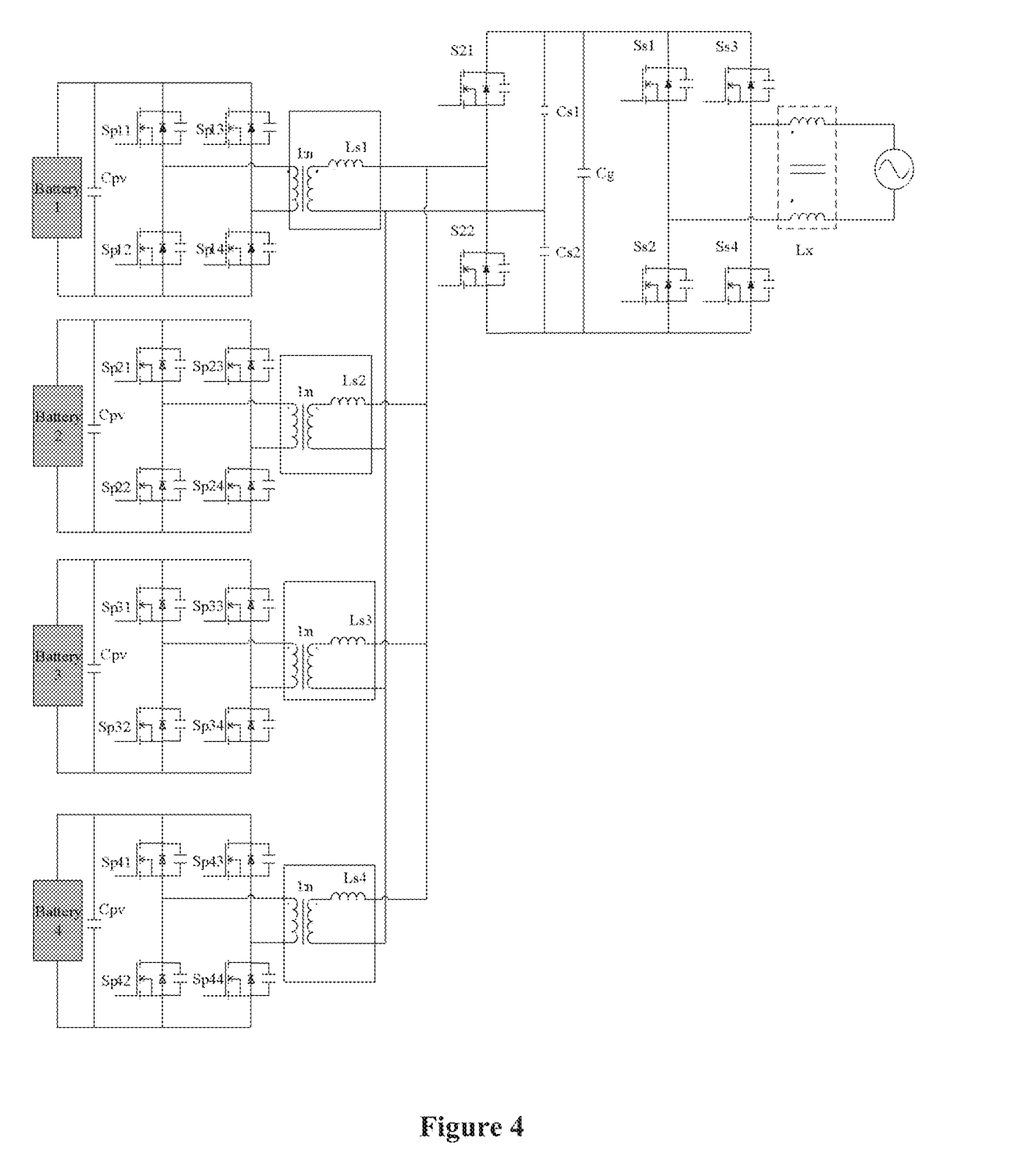
FIG. 4 is a schematic diagram of a micro inverter according to another embodiment of the present disclosure.

Reference is made to FIG. 4, which is a schematic diagram of a micro inverter according to another embodiment of the present disclosure.

The primary windings of the transformers in the isolated DC-DC converters are independent from each other, and the secondary windings of the transformers in the isolated DC-DC converters are independent from each other. The secondary windings of the transformers are connected in parallel to each other. The parallel secondary windings are connected to the input terminal of the voltage-multiplying rectifier.

An equivalent leakage inductor of the parallel secondary windings forms series resonance along with the capacitor in the voltage-multiplying rectifier.

The equivalent leakage inductor of the parallel leakage inductors Ls1, Ls2, Ls3 and Ls4 of the transformers forms the series resonance along with the capacitor (Cs1 and Cs2) in the capacitor arm. In addition, the input terminal of the DC-AC converter is further connected to a bus capacitor Cg. That is, the bus capacitor Cs is connected in parallel with the input terminal of the DC-AC converter.

Magnetic channels of the transformers as in FIG. 4 are independent from each other. An integrated parasitic inductor (an equivalent leakage inductor) resonates along with the capacitor in the capacitor arm.

The following description is made by taking the case in which the micro inverter includes four isolated DC-DC converters as an example. Each of the secondary windings of the four transformers is connected in series to a corresponding one of four leakage inductors Ls1, Ls2, Ls3, and Ls4.

It can be seen from FIG. 4 that each of the four secondary windings is connected in series to a corresponding leakage inductor, and serial connections of a secondary winding and a leakage inductor are connected in parallel.

The topology in FIG. 3 is compared with the topology in FIG. 4. The secondary windings shown in FIG. 3 are connected in series, a voltage on a secondary side is higher than that in the topology shown in FIG. 4. That is, the topology in FIG. 3 results in a higher input voltage to the voltage-multiplying rectifier. The secondary windings shown in FIG. 4 are connected in parallel with each other, so that a voltage on the secondary side for the topology shown in FIG. 4 is less than that for the topology shown in FIG. 3.

The magnetic channels of the transformers as shown in FIG. 3 or FIG. 4 are uncoupled with each other, so that difficulty in controlling the system is reduced. In an application of a photovoltaic system, transformers on input sides of multiple photovoltaic components are independent from each other, which is conducive to distributed arrangement, heat distribution and heat dissipation, so as to improve stability of the system. Due to adoption of the isolated DC-DC converters in the embodiments of the present disclosure, electrical isolation is realized at the direct current side, which is conducive to improving safety of a product.

Described above are situations in which the micro inverter includes multiple transformers. A situation in which a micro inverter includes only one transformer, that is, multiple direct current power supplies correspond to a same transformer, is described below.

Figure 5:
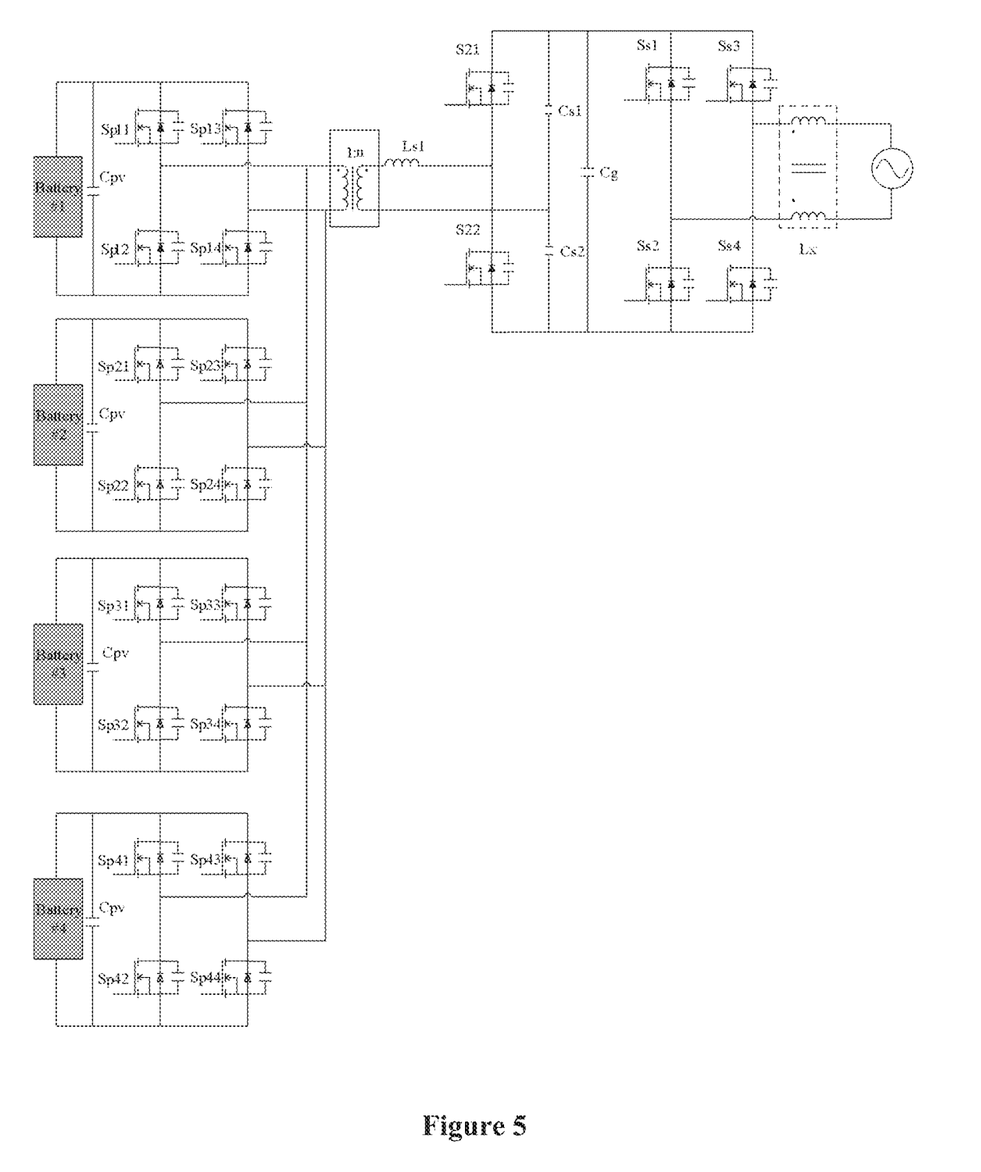
FIG. 5 is a schematic diagram of a micro inverter according to another embodiment of the present disclosure.

Reference is made to FIG. 5, which is a schematic diagram of a micro inverter according to another embodiment of the present disclosure.

In the micro inverter according to this embodiment of the present disclosure, transformers of multiple isolated DC-DC converters share a same primary winding and a same secondary winding.

Compared with the topologies shown in FIG. 3 and FIG. 4, the number of the primary winding and the number of the secondary windings are reduced in the topology shown in FIG. 5. Therefore, the volume of the transformer is further reduced, and a hardware cost is reduced.

Taking a case of four direct current power supplies as an example, each of the direct current power supplies corresponds to one inverter H-bridge. Output terminals of the four inverter H-bridges are connected in parallel with each other, and the parallel output terminals are connected to a primary winding.

In this embodiment, a leakage inductor Ls1 of the transformer forms series resonance along with capacitors Cs1 and Cs2. Adjustment on a resonance frequency can realize adjustment of impedance of the circuit, and thereby a current in the load is adjusted. Therefore, a gain of the micro inverter can be adjusted, and thereby the turn ratio of the transformer can be reduced, and the volume of the transformer is reduced.

In FIG. 5, transformers are disposed in a centralized manner. An integrated parasitic inductor (an equivalent leakage inductor) resonates along with the capacitor in the capacitor arm.

Topology of the inverter H-bridge is not limited in the embodiments of present disclosure. For example, the inverter H-bridge is a full-bridge inverter circuit.

Topology of the DC-DC converter is not limited in the embodiments of present disclosure. For example, the DC-AC converter may be a full-bridge DC-AC converter.

Figure 6:
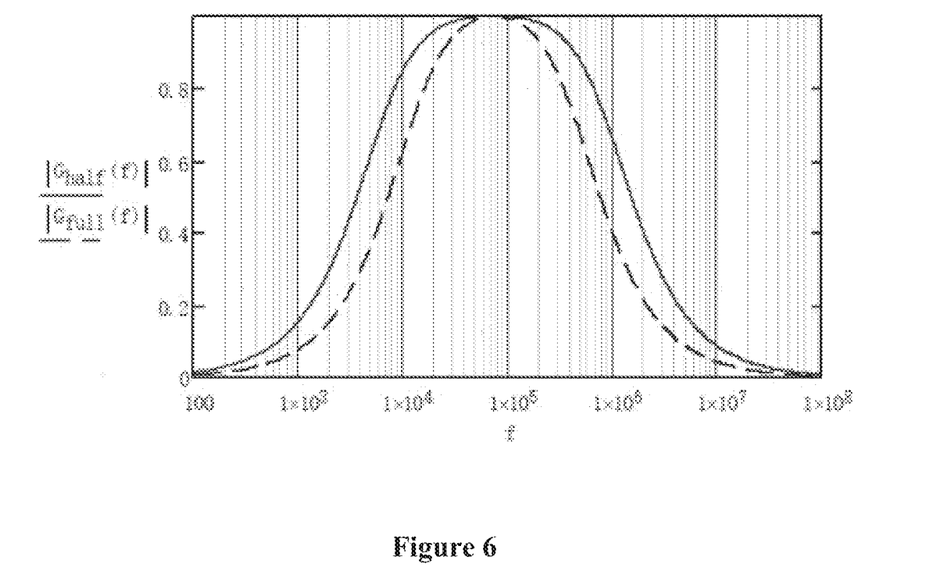
FIG. 6 is a schematic graph showing a voltage gain curve according to an embodiment of the present disclosure.

In the micro inverter according to the above embodiments of the present disclosure, a series resonance loop is formed through the capacitor in the voltage-multiplying rectifier and the leakage inductor or equivalent leakage inductor of the transformer, so that the voltage gain of the circuit can be regulated between 0 and 1, as shown in FIG. 6, which is conducive to reducing the turn ratio of the transformer and reducing the voltage stress of the switch transistors. In FIG. 6, an abscissa represents a frequency and an ordinate represents the voltage gain.

In FIG. 6, a solid line represents a voltage gain curve in a case that the load is half-load, and a dotted line represents a voltage gain curve in a case that the load is full-load.

In addition, control of a switching mode may include phase-shifting control and regulating a duty cycle, depending on different conditions, so as to optimize a current stress of the switch transistors and a range of a zero voltage switching (ZVS). A type of the switch transistors is not limited in the embodiments of the present disclosure. For example, the switch transistors may be MOS transistors. The switch transistor on the primary side of the transformer operates in a ZVS mode, and the switch transistor in the voltage-multiplying rectifier on the secondary side operates in a ZCS mode, both of which can reduce power consumption, and thereby improve a power conversion efficiency of the system.

Based on the micro inverter according to the above embodiments, a photovoltaic system is further provided according to an embodiment of the present disclosure. The photovoltaic system is described in detail below in conjunction with the drawings.

Figure 7:
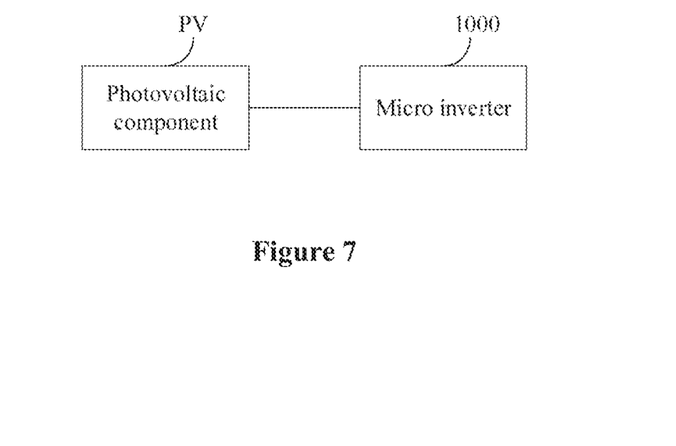
FIG. 7 is a schematic diagram of a photovoltaic system according to an embodiment of the present disclosure.

Reference is made to FIG. 7, which is a schematic diagram of a photovoltaic system according to an embodiment of the present disclosure.

The photovoltaic system according to an embodiment of the present disclosure includes a photovoltaic component PV and the micro inverter according to any of the above embodiments.

In the micro inverter included in the photovoltaic system, a series resonance loop is formed through the capacitor in the voltage-multiplying rectifier and the leakage inductor or equivalent leakage inductor of the transformer, so that the voltage gain of the circuit can be regulated. Therefore, it is conducive to reducing the turn ratio of the transformer, reducing the volume of the transformer, reducing the voltage stress of the switch transistors, and saving a coat of the photovoltaic system.

With the above description of the disclosed embodiments, those skilled in the art can implement or use the present disclosure. It is obvious for those skilled in the art to make many modifications to these embodiments. The general principle defined herein may be applied to other embodiments without departing from the scope of the present disclosure. Therefore, the present disclosure shall not be limited to the embodiments described herein but have the widest scope that complies with the principle and novelty disclosed in this specification.

The invention claimed is:

1. A micro inverter having a plurality of independent inputs, comprising one or more isolated DC-DC converters and a DC-AC converter, wherein:
   each isolated DC-DC converter of the plurality of isolated DC-DC converters comprise an inverter H-bridge, a transformer, and a voltage-multiplying rectifier;
   an input terminal of the inverter H-bridge is configured to connect to a direct-current power supply;
   a secondary winding of the transformer is connected to an input terminal of the voltage-multiplying rectifier;
   an output terminal of the voltage-multiplying rectifier is connected to an input terminal of the DC-AC converter;
   a leakage inductor or an external inductor of the transformer forms series resonance along with a capacitor in the voltage-multiplying rectifier;
   the voltage-multiplying rectifier comprises a switch arm and a capacitor arm, wherein the switch arm and the capacitor arm are connected in parallel;
   two terminals of the secondary winding of the transformer are connected to an intermediate terminal in the switch arm and an intermediate terminal in the capacitor arm, respectively; and
   the leakage inductor forms the series resonance along with the capacitor which is in the capacitor arm.

2. The micro inverter according to claim 1, wherein:
   transformers in the DC-DC converters have isolated primary windings and isolated secondary windings,
   the secondary windings of the transformers are connected in parallel with each other,
   the parallel secondary windings are connected to the input terminal of the voltage-multiplying rectifier; and
   an equivalent leakage inductor of the parallel secondary windings forms the series resonance along with the capacitor in the voltage-multiplying rectifier.

3. The micro inverter according to claim 1, wherein transformers in the DC-DC converters have isolated primary windings,
   secondary windings of the transformers are connected in series, the external inductor is connected in series between the series-connected secondary windings of the transformers and the input terminal of the voltage-multiplying rectifier; and the external inductor forms the series resonance along with the capacitor in the voltage-multiplying rectifier.

4. The micro inverter according to claim 1, wherein transformers of the isolated DC-DC converters share a same primary winding and a same secondary winding.

5. The micro inverter according to claim 1, wherein two output terminals of the inverter H-bridge are connected to two terminals of a primary winding of the transformer, respectively.

6. The micro inverter according to claim 1, wherein the inverter H-bridge is a full-bridge inverter, and the DC-AC converter is a full-bridge DC-AC converter.

7. The micro inverter according to claim 1, further comprising:

a bus capacitor, connected in parallel with the input terminal of the DC-AC converter; and a filter circuit, connected to an output terminal of the DC-AC converter;

wherein the micro inverter is a bi-directional inverter.

8. The micro inverter according to claim 1, wherein the direct-current power supply is a photovoltaic component, a power battery, or a fuel cell.

9. A photovoltaic system, comprising:

a photovoltaic component; and a micro inverter having a plurality of independent inputs, wherein the micro inverter is connected to an output of the photovoltaic component, and wherein the micro inverter comprises one or more isolated DC-DC converters and a DC-AC converter, each isolated DC-DC converter of the plurality of isolated DC-DC converters comprise an inverter H-bridge, a transformer, and a voltage-multiplying rectifier;

an input terminal of the inverter H-bridge is configured to connect to a direct-current power supply;

a secondary winding of the transformer is connected to an input terminal of the voltage-multiplying rectifier;

an output terminal of the voltage-multiplying rectifier is connected to an input terminal of the DC-AC converter; and a leakage inductor or an external inductor of the transformer forms series resonance along with a capacitor in the voltage-multiplying rectifier;

wherein in the micro inverter:

the voltage-multiplying rectifier comprises a switch arm and a capacitor arm, wherein the switch arm and the capacitor arm are connected in parallel;

two terminals of the secondary winding of the transformer are connected to an intermediate terminal in the switch arm and an intermediate terminal in the capacitor arm, respectively; and the leakage inductor forms the series resonance along with the capacitor which is in the capacitor arm.

10. The photovoltaic system according to claim 9, wherein in the micro inverter:

transformers in the DC-DC converters have isolated primary windings and isolated secondary windings, the secondary windings of the transformers are connected in parallel with each other, the parallel secondary windings are connected to the input terminal of the voltage-multiplying rectifier; and an equivalent leakage inductor of the parallel secondary windings forms the series resonance along with the capacitor in the voltage-multiplying rectifier.

11. The photovoltaic system according to claim 9, wherein in the micro inverter:

transformers in the DC-DC converters have isolated primary windings, the secondary windings of the transformers are connected in series, the external inductor is connected in series between the series-connected secondary windings of the transformers and the input terminal of the voltage-multiplying rectifier; and the external inductor forms the series resonance along with the capacitor in the voltage-multiplying rectifier.

12. The photovoltaic system according to claim 9, wherein in the micro inverter, transformers of the isolated DC-DC converters share a same primary winding and a same secondary winding.

13. The photovoltaic system according to claim 9, wherein in the micro inverter:

two output terminals of the inverter H-bridge are connected to two terminals of a primary winding of the transformer, respectively.

14. The photovoltaic system according to claim 9, wherein in the micro inverter, the inverter H-bridge is a full-bridge inverter, and the DC-AC converter is a full-bridge DC-AC converter.

15. The photovoltaic system according to claim 9, wherein the micro inverter further comprises:

a bus capacitor, connected in paralleling with the input terminal of the DC-AC converter; and a filter circuit, connected to an output terminal of the DC-AC converter;

wherein the micro inverter is a bi-directional inverter.

16. The photovoltaic system according to claim 9, wherein in the micro inverter, the direct-current power supply is a photovoltaic component, a power battery, or a fuel cell.

* * * * *